No. 745,381. Patented December 1, 1903.

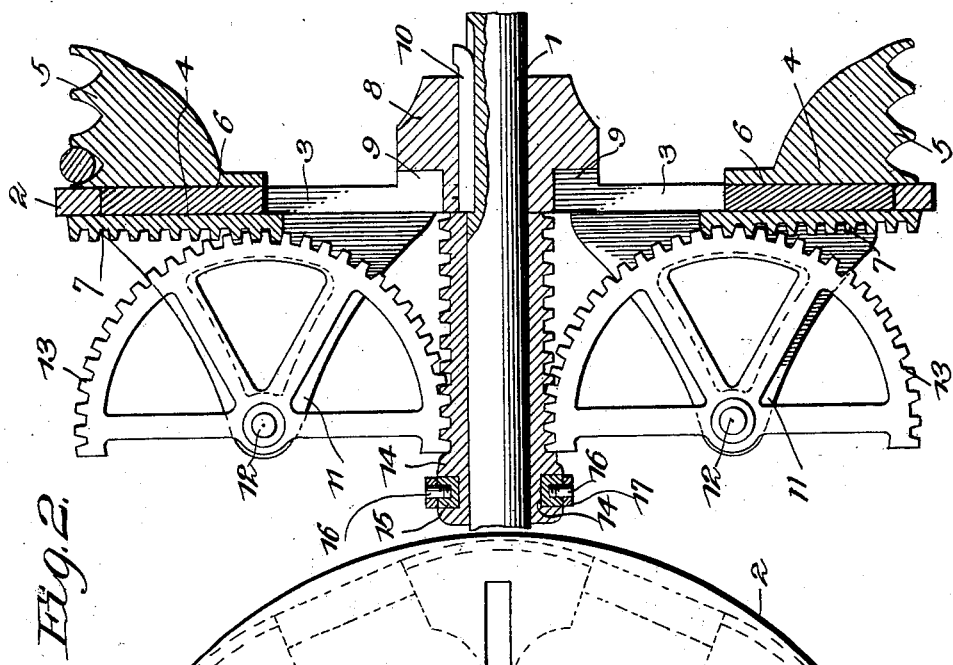

UNITED STATES PATENT OFFICE.

WILLIAM ARTHUR PETERS, OF BONHAM, AND REYNOLDS MAY, OF WHITEWRIGHT, TEXAS.

EXPANSIBLE PULLEY.

SPECIFICATION forming part of Letters Patent No. 745,381, dated December 1, 1903.

Application filed March 31, 1903. Serial No. 150,467. (No model.)

*To all whom it may concern:*

Be it known that we, WILLIAM ARTHUR PETERS, residing at Bonham, county of Fannin, and REYNOLDS MAY, residing at Whitewright, county of Grayson, State of Texas, citizens of the United States, have invented a new and useful Expansible Pulley, of which the following is a specification.

This invention relates to expansible pulleys, and has for its object to provide an expansible pulley of simple construction which may be expanded or contracted easily and which will possess great durability.

The invention consists, generally speaking, in a disk having a plurality of belt-supporting segments mounted so as to be slidable radially on the disk and means for adjusting said belt-supporting segments on the disks, said means comprising racks provided upon the belt-supporting segments and gear-segments in engagement with said racks, together with means for imparting movement to said gear-segments.

In its preferred form the invention consists of the construction and combination of parts hereinafter described and claimed, and shown in the drawings accompanying this specification and forming a part thereof, in which corresponding parts are designated by the same characters of reference throughout both views in which they appear.

In the drawings, Figure 1 is a front elevation of the pulley with the segments shown in solid lines as contracted and in dotted lines as expanded. Fig. 2 is a section through the pulley on a diameter thereof, the supporting-shaft being shown for the most part in elevation and part being broken away to show the key by means of which the pulley is secured to the shaft.

Referring to the drawings by reference characters, 1 designates a shaft upon which is rigidly mounted a disk 2, having a plurality of radially-disposed slots 3, preferably eight in number, which extend from points near the shaft 1 to points adjacent to the periphery of the disk. Mounted in the slots 3 are sliding members 4, each comprising a belt-supporting segment 5, bosses 6, upon which the belt-supporting segments are carried, and racks 7, disposed upon the opposite side of the disk 2 from the belt-supporting segments 4. The disk 2 has a hub 8 provided with slots 9, which register with the slots 3 provided in the disk and afford guides for the inner ends of the bosses 6, supporting the belt-supporting segments. The hub 8 is provided with a keyway for the insertion of a key 10, which also enters a keyway provided in the shaft 1, and so forms means for rigidly securing the disk 2 in position on said shaft.

The slidable members 4 should preferably be formed in two parts, which may be secured together in any desired manner, one part comprising a rack 7 and the portion of the slidable member which lies in a slot in the disk 2, the other section comprising a belt-supporting segment and the boss upon which it rests. The object of making each of the sliding members of two parts will be readily understood. The portion which lies in each slot is narrower than the rack formed integral therewith or the belt-supporting segment secured to it in any suitable way. Owing to this relation in width of the parts of each of the slidable members, it would be impossible to insert said members in their slots if they were formed integral; but by making each member in two parts it is possible to introduce the section which moves in the slot and carries with it the rack attached thereto and afterward to attach the section which carries the belt-supporting segments. When inserted into the slots in this manner, the slidable members are securely held in the slots and cannot become accidentally removed therefrom.

On the rear face of the disk 2 at suitable points there are provided a plurality of brackets 11, affording bearings for shafts 12, to which are secured gear-segments 13. Each of said gear-segments is preferably a little over one hundred and eighty degrees in extent and is in mesh with a rack on one of the slidable members 4.

Slidably mounted on the shaft 1 is a sleeve 14, the outer surface of which is formed into ridges disposed circumferentially thereon and forming a rack which is in engagement with all of the gear-segments 13. At the end of the sleeve 14 remote from the disk 2 there is provided in a groove 14, formed on the sleeve, a collar 15, to which is firmly secured, by means of screws 16, the bifurcated end of a lever 17 for imparting movement to said sleeve longitudinally of the shaft 1.

The operation of the expansible pulley will be readily understood from the foregoing description and an inspection of the drawings. When the sleeve 14 is moved away from the disk 2 into the position indicated in dotted lines, the gear-segments 13 will be partially rotated, and through their engagement with the sliding members 4 said members will be moved to the inner ends of the slots in which they are mounted, thus contracting the pulley. When the sleeve 14 is moved into contact with the disk 2, (indicated in full lines in Fig. 1,) an opposite movement of the gear-segments takes place, and the sliding members 4 will be moved to the outward limits of their guide-slots 3.

The pulley hereinbefore described is intended for use with another pulley of similar design, which is to be so connected with its fellow that the expansion of one will always be accompanied by the contraction of the other, thus keeping the same degree of tension upon the belt at all times regardless of the adjustment of the belt-supporting segments upon the pulleys. When the two expansible pulleys are placed near together, a convenient form of connection to insure the operation just mentioned is found in the operating-lever for each pulley. If a single lever is to be used to operate both pulleys, the sleeve of one pulley is secured to one end of the lever, the sleeve of the other pulley being secured to the other end of the lever.

In the drawings the belt-supporting segments are shown as provided with grooves for the reception of rope belting or the like; but it is obvious that the belt-supporting segments may be given other forms suitable to different forms of belting, if desired. It is to be understood that we do not wish to be limited to the exact form, proportions, or mode of assemblage of the elements hereinbefore described, and shown in the accompanying drawings, but reserve the right to make changes therein which do not depart from the spirit of the invention and lie within the scope of the appended claims.

Having thus described our invention, what we claim as new, and desire to secure by Letters Patent, is—

1. The combination in an expansible pulley of a disk, a plurality of belt-supporting segments with radially-disposed stems slidably mounted on said disk, a rack provided on the stem of each belt-supporting segment, a gear disposed in a plane at right angles to said disk in mesh with each of said racks, and means for imparting movement to said gears to move said belt-supporting segments radially on the face of said disk.

2. In an expansible pulley, the combination of a disk having a plurality of belt-supporting segments with radially-disposed stems slidably mounted on said disk, a rack provided on the stem of each of said belt-supporting segments, a segmental gear disposed in a plane at right angles to said disk in mesh with each of said racks, and means for rocking said gears to impart movement to said belt-supporting segments radially of said disk.

3. In an expansible pulley, the combination of a disk having a plurality of radially-disposed slots extending therethrough, a plurality of belt-supporting segments having radial stems mounted to slide in said slots, a rack on each of said stems, a gear disposed in a plane at right angles to said disk in mesh with each of said racks, and means for rocking said gears to impart movement to said belt-supporting segments radially of said disk.

4. In an expansible pulley, the combination of a disk having a plurality of radially-disposed slots, a plurality of belt-supporting segments each having a stem slidably mounted in one of said slots, a rack provided on each of said stems and lying upon the opposite side of said disk from said belt-supporting segments, a gear disposed in a plane at right angles to said disk in mesh with each of said lugs, and means for rocking said gears to move said belt-supporting segments radially of said disk.

5. In an expansible pulley, the combination of a disk having a plurality of radially-disposed slots closed at either end, a plurality of belt-supporting segments with stems slidably mounted in said slots, a rack secured to each of said stems, a gear disposed in a plane at right angles to said disk in mesh with each of said racks, and means for simultaneously rocking said gears to impart movement to said belt-supporting segments radially of said disk.

6. In an expansible pulley, the combination of a shaft, a disk rigidly mounted thereon, said disk having a plurality of radially-disposed slots, a plurality of belt-supporting segments having stems radially mounted in said slots, a rack secured to each of said stems, a gear disposed in a plane at right angles to said disk in mesh with each of said racks, a sleeve slidably mounted on said shaft and provided with circumferential ridges forming a rack in mesh with each of said gears, and means for sliding said sleeve upon said shaft to impart movement to said belt-supporting segments radially of said disk.

7. In an expansible pulley, the combination of a shaft, a disk rigidly mounted thereon and having a plurality of radially-disposed slots extending therethrough, a plurality of belt-supporting segments having stems slidably mounted in said slots, a rack secured to each of said stems, a gear disposed in a plane at right angles to said disk in mesh with each of said racks, a sleeve slidably mounted on said shaft and having a plurality of circumferential ridges forming a rack in engagement with all of said gears, a collar rotatably mounted on said sleeve, and a lever connected with said collar and forming means whereby said sleeve may be moved longitudinally of said shaft to expand or contract the pulley.

In testimony that we claim the foregoing as our own we have hereto affixed our signatures in the presence of two witnesses.

WILLIAM ARTHUR PETERS.
REYNOLDS MAY.

Witnesses:
JOHN C. SPARGER,
T. J. BABB.